United States Patent [19]
Peier

[11] Patent Number: 5,203,439
[45] Date of Patent: Apr. 20, 1993

[54] ADJUSTABLE VISCOUS SHEAR COUPLING

[75] Inventor: Othmar Peier, Pöllau, Austria

[73] Assignee: Steyr-Daimler-Puch AG, Vienna, Austria

[21] Appl. No.: 842,718

[22] Filed: Feb. 27, 1992

[30] Foreign Application Priority Data

Mar. 8, 1991 [AT] Austria ................................ 498/91

[51] Int. Cl.⁵ ............................................. F16D 35/00
[52] U.S. Cl. .................................... 192/58 C; 192/58 B
[58] Field of Search ............................. 192/58 B, 58 C

[56] References Cited

U.S. PATENT DOCUMENTS

| 4,844,219 | 7/1989 | Stockmar | 192/58 C |
| 4,942,951 | 7/1990 | Kriebernegg et al. | 192/58 C |
| 5,090,534 | 2/1992 | Horst | 192/58 B |

FOREIGN PATENT DOCUMENTS 384086 9/1987 Austria.
3928975 5/1990 Fed. Rep. of Germany.

Primary Examiner—Richard M. Lorence
Attorney, Agent, or Firm—Marmorek, Guttman & Rubenstein

[57] ABSTRACT

An adjustable viscous shear coupling comprises a housing containing a viscous fluid therein, an inner part such as a shaft extending into the housing, a set of outer disks non-rotatably connected to the housing, a set of inner disks non-rotatably connected to the inner part, the inner disks and the outer disks being interleaved so that adjacent disks are separated by a gap, and an axially movable piston which acts on the disks to adjust the width of the gaps. The adjustable viscous shear coupling is constructed so that sealing intervals are formed between the outer disks and the inner part and between the inner disks and the housing so that the overflow of viscous fluid from one gap to another is greatly inhibited. In a preferred embodiment, the adjustable viscous shear coupling includes inner choke elements disposed between the outer disks and the inner part, and outer choke elements disposed between the inner disks and the housing, the choke elements creating the sealing intervals.

6 Claims, 3 Drawing Sheets

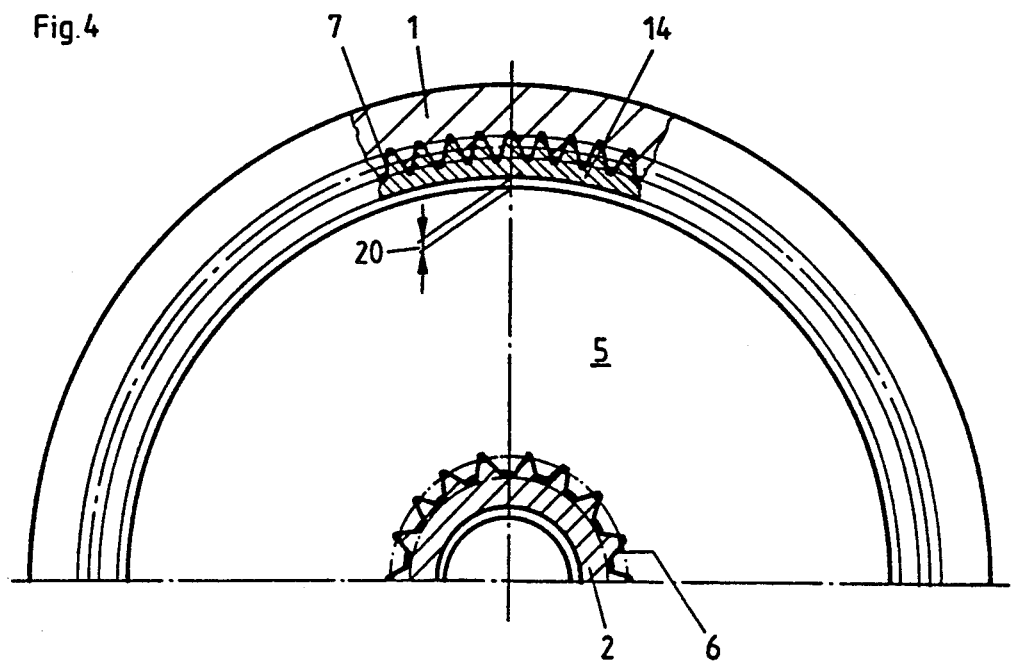
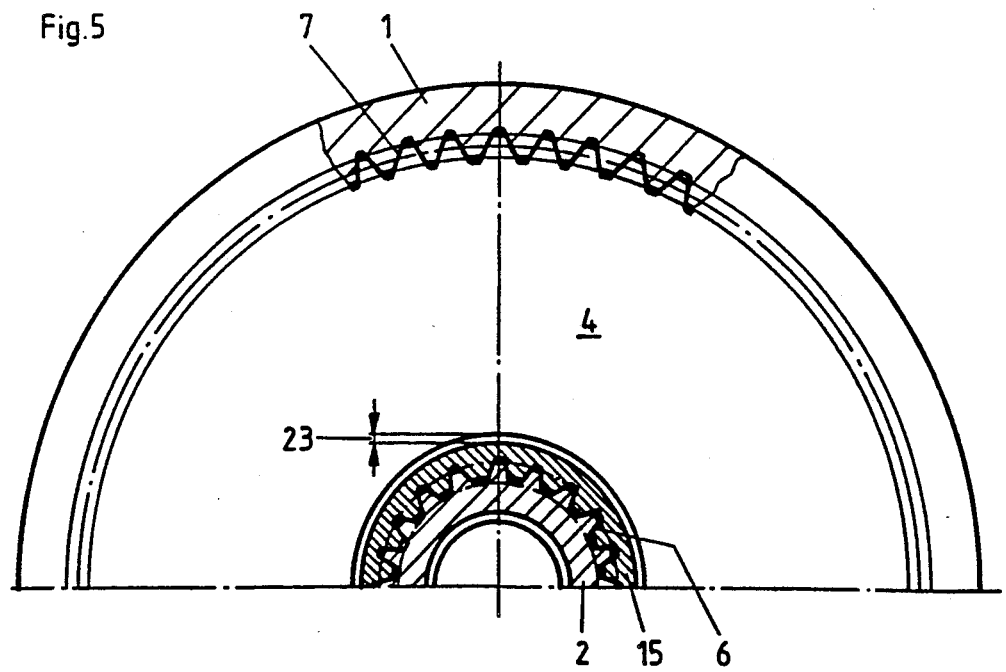

ADJUSTABLE VISCOUS SHEAR COUPLING

BACKGROUND OF THE INVENTION

The invention relates to a viscous shear coupling comprising a housing filled with a viscous fluid, an inner part such as a shaft extending into the housing, and intermeshing inner and outer disks alternately and non-rotatably connected to the shaft and to the housing, wherein the width of the gap between adjacent disks is adjustable by means of a piston.

Such adjustable viscous shear couplings are used in allwheel drive motor vehicles in order to adapt the torque transmitted to the second, driven axle to the prevailing travel conditions. The adaptation is accomplished by changing the distance between the disks and/or by changing the degree to which the housing is filled with viscous fluid.

Adjustable viscous shear couplings are different from nonadjustable ones mainly in that no steep rise of the transmitted torque occurs in the latter as a result of a rise in heat and pressure in the coupling (the so-called "hump"). In known adjustable viscous shear couplings, elastic spacing elements are provided between the individual disks of a disk pack in order to ensure uniform disk spacings even when the individual disks are shifted axially, and in order to avoid friction-producing contact between individual disks. In the viscous shear coupling known from AT-PS 384,086 (U.S. No. 4,844,219), the elastic spacing elements are Belleville spring washers.

Such spacer elements are of considerable height, thus reducing the extent of the overlap of the inner and outer disks for a given housing diameter. Because of this, the effective surfaces of the disks and the transmitted torque are reduced. The elastic spacer elements also have the great disadvantage that they oppose the adjusting piston with a force which increases as the gap width is reduced, so that a greater force is required to effect the same adjustment. Furthermore, a thrust bearing which takes up space and is subject to wear must be installed in the housing to transmit the piston movement to the inner disks. Finally, the area outside the spring washers must also be considered as being dead space with regard to the degree to which the coupling is filled. Therefore, a larger adjustment of the gap width is required to compensate for this dead space.

It is known from DE-PS 39 28 975 to provide spacer rings between the disks of a set in order to reduce this dead space and to facilitate assembly of the coupling. However, this patent relates to a non-adjustable viscous shear coupling. The disks of one of the two disk packs cannot be shifted axially. Therefore, the intermediate rings act only as spacers between these fixed disks. An axial movement of the disks of the other disk pack only occurs during the "hump" when the axially displaceable disks are pressed against one of the two adjoining fixed disks. The disks are open-worked in order to promote the reaching of the "hump." Seals between movable disks and spacer rings are not formed because they would interfere with the movable disks being pressed against the fixed disks in this manner.

The present invention has as its object to ensure the maintenance of equal distances between the disks without utilizing mechanical spring elements and thus to reduce the size of an adjustable viscous shear coupling and to make it possible to operate with as small an adjusting force and as short an adjusting path as possible.

SUMMARY OF THE INVENTION

These and other objects are achieved according to the invention which provides an adjustable viscous shear coupling, comprising a housing containing a viscous fluid therein, an inner part such as a shaft extending into the housing, a set of outer disks non-rotatably connected to the housing, a set of inner disks non-rotatably connected to the inner part, the inner disks and the outer disks being interleaved so that adjacent disks are separated by gaps, and an axially movable piston which acts on the disks to adjust the width of the gaps. The adjustable viscous shear coupling is constructed so that sealing intervals are formed between the outer disks and the inner part, and between the inner disks and the housing, so that the overflow of viscous fluid from one disk interval to another is greatly inhibited. In a preferred embodiment, the adjustable viscous shear coupling includes inner choke elements disposed between the outer disks and the inner part, and outer choke elements disposed between the inner disks and the housing, the choke elements creating the sealing intervals.

When the piston is shifted axially, the pressure rise in the space in front of the piston causes the first disk to recede without requiring any mechanical contact between the piston and the disk. Therefore, a thrust bearing is not required, so that the axial length of the housing is reduced. The sealing interval which is formed between the disk and the housing, or between the disk and the shaft (depending on whether an inner disk or an outer disk is involved) prevents any pressure compensation caused by fluid flow around the disks. In this manner, all the disks in the interior of the housing will adjust themselves so as to be at the same distance from each other in order to achieve pressure compensation between the different intervals. Because of the high viscosity of the fluid, no great demands need to be made on the degree of sealing tightness. As a result mechanical spring elements as are used in the prior art can be dispensed with and the diameter of the coupling housing can be reduced for a given effective disk surface. At the same time, the dead space is also reduced, and this has the additional advantage in an adjustable viscous shear coupling that a shorter stroke of the piston is sufficient for an identical change in the degree of filling.

As mentioned above, in an advantageous embodiment of the invention, outer and inner choke elements are provided to ensure tightness of the seal to inhibit flow of the viscous fluid. The choke elements have teeth which mesh with the teeth of the housing or the shaft and are capable of axial shifting.

In this way, the flow of fluid around the disks through gaps in the teeth is easily prevented, and the radial sealing intervals' effectiveness is independent of the precise axial position of the choke elements and the disks in relation to each other. Furthermore, no wear takes place in the sealing intervals.

In another embodiment of the invention, the axial width of the inner and/or outer choke elements is equal to the thickness of their associated disks, plus twice the minimum disk interval. In this manner, the disks cannot come into contact with each other and no mechanical friction occurs between the disks, even in extreme cases (due to leaks, reduced filling, or a particularly large adjustment movement), and sealing intervals are formed between the choke elements and the adjoining disks even at nearly minimum interval widths.

The outer choke elements can be used additionally as piston stops to fix the minimum interval width since, by contrast with the inner choke elements, they do not execute a rotating movement relative to the piston. For this reason, the machining tolerance of the faces of the choke elements at a right angle to the axis must be positive (i.e., errors will be made on the side of being too large) for the outer choke elements and negative (i.e., errors will be made on the side of being too small) for the inner choke elements with respect to their desired width (disk thickness plus two times minimum interval width).

In a further refinement, the radii of the sealing surfaces of the piston are equal to the average surface radii of the teeth on the housing and on the shaft. As a result, the occurrence of a pump effect by the piston movement and the impact of the adjoining inner disk upon the piston and upon the adjoining inner choke element is safely avoided.

BRIEF DESCRIPTION OF THE DRAWINGS

A preferred embodiment of the invention is described below by reference to the drawings, wherein:

FIG. 4 is an axial section along line 4—4 in FIG. 2, and FIG. 5 is a cross-section along line 5—5 in FIG. 2.

DETAILED DESCRIPTION OF PREFERRED EMBODIMENT

Figure 1:
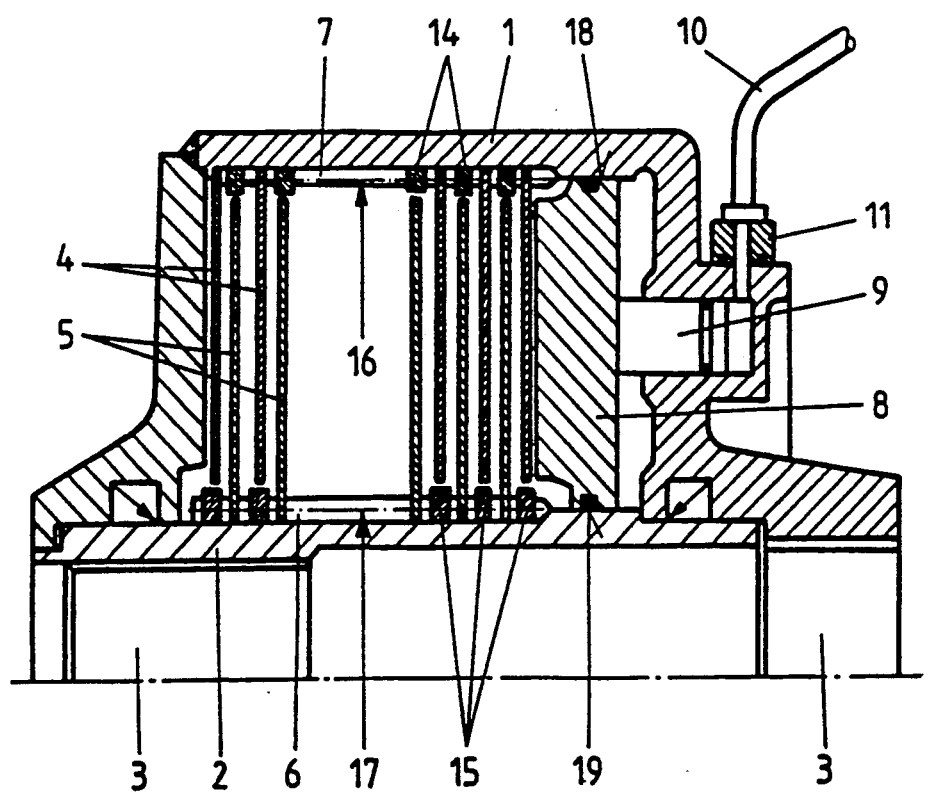
FIG. 1 is an axial section through an adjustable viscous shear coupling according to the invention.

The viscous shear coupling shown in FIG. 1 comprises a fluid-tight outer part, namely, housing 1, and a freely rotatable inner part, namely, shaft 2, installed in the housing 1. The two parts 1 and 2 are provided with spline toothings 3 or similar means for non-rotatable connection with a drive or output shaft (not shown here). Outer disks 4 and inner disks 5 constituting two coaxially intermeshing sets serve as coupling elements between the outer coupling part 1 and the inner coupling part 2. The outer disks 4 are connected non-rotatably but axially displaceably to the outer coupling part 1 and the inner disks 5 to the inner coupling part 2, in this case by means of teeth 6,7.

The housing 1 is filled with a viscous fluid, the minimum degree of filling being approximately 50% and the maximum degree of filling being up to 95%. These numbers refer to the degree of filling at normal temperature. The remainder of the housing is filled with air which mixes with the fluid as a result of the movement of the inner disks 5 in relation to the outer disks 4 and which acts as a spring due to its compressibility. The mixing of air and viscous fluid is especially thorough if the housing 1 does not rotate. The characteristic curve of the viscous shear coupling can be influenced by changing the degree of filling.

A piston 8 capable of sliding in a sealed manner extends from housing 1 to the shaft 2. The piston 8 is displaced by means of one or several actuating pistons 9 pushed in a controlled manner by a hydraulic pressure medium in a line 10 and if necessary, a sliding ring 11. The piston 8 together with housing 1 and the inner part 2 form cylindrical sealing surfaces 18,19 the radii of which are equal to the average radii 16,17 of the teeth 6,7.

The disk sets comprising the outer and inner disks 4,5 are assembled by first placing an outer disk 4 at either end of the housing. The outer disk is mounted directly on the housing 1 or at the piston 8. Because of the non-rotatable connection of the outer disks 4 to the housing 1, the piston 8 need not be secured further against rotation. Choke elements 14,15 which can be shifted axially are installed between the inner edges of the outer disks 4 and the inner part 2 as well as between the outer edges of the inner disks 5 and the housing 1, as can be seen more clearly in FIGS. 2 to 5.

The choke elements 14 are rings with teeth on their outer edges (see FIG. 4) which mesh with the teeth 7 of the housing 1 so that they are connected to the housing non-rotatably but are capable of being displaced axially. The width of the rings is equal to the thickness of the associated inner disks 5, plus twice the minimum gap width 22 between two adjoining disks. The width tolerance of the outer choke elements 14 is positive so that metallic friction between the disks is safely prevented.

Between the cylindrical inner surface of the outer choke elements 14 and the outer edges of the inner disks 5 is a sealing interval 20 (not drawn to scale but shown greatly enlarged) which prevents the inner disks from being surrounded by fluid flow. In an entirely analogous fashion, the inner choke elements 15 also constitute rings with teeth (see FIG. 5) which mesh with the teeth 6 of the inner part 2, and which form sealing intervals 23 (not drawn to scale but shown greatly enlarged) with the inner edges of the outer disks. However, the width tolerance of the inner choke elements 15 is negative so as to ensure that the piston stop for the minimum interval width is fixed by the outer choke elements 14.

Figure 3:
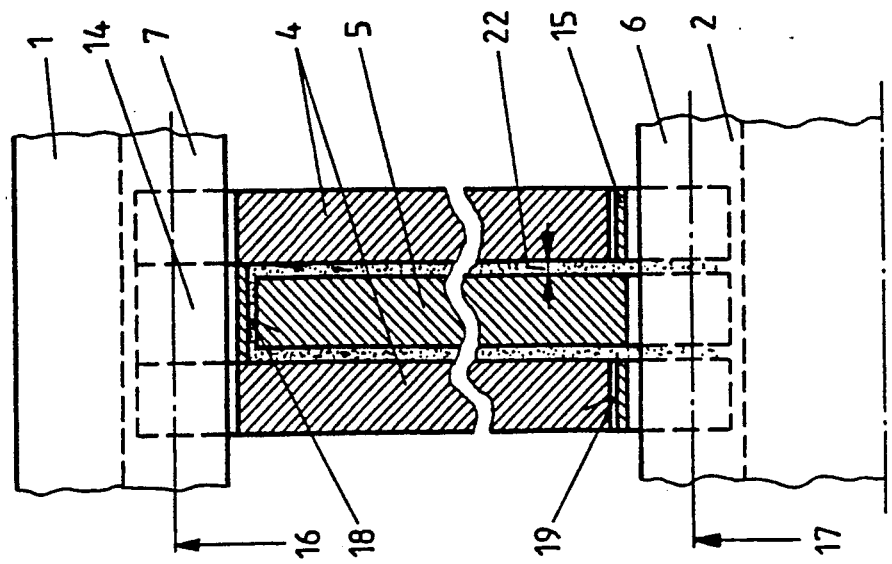
FIG. 3 is an enlarged representation of several disks of FIG. 1 at minimum gap width.
Figure 2:
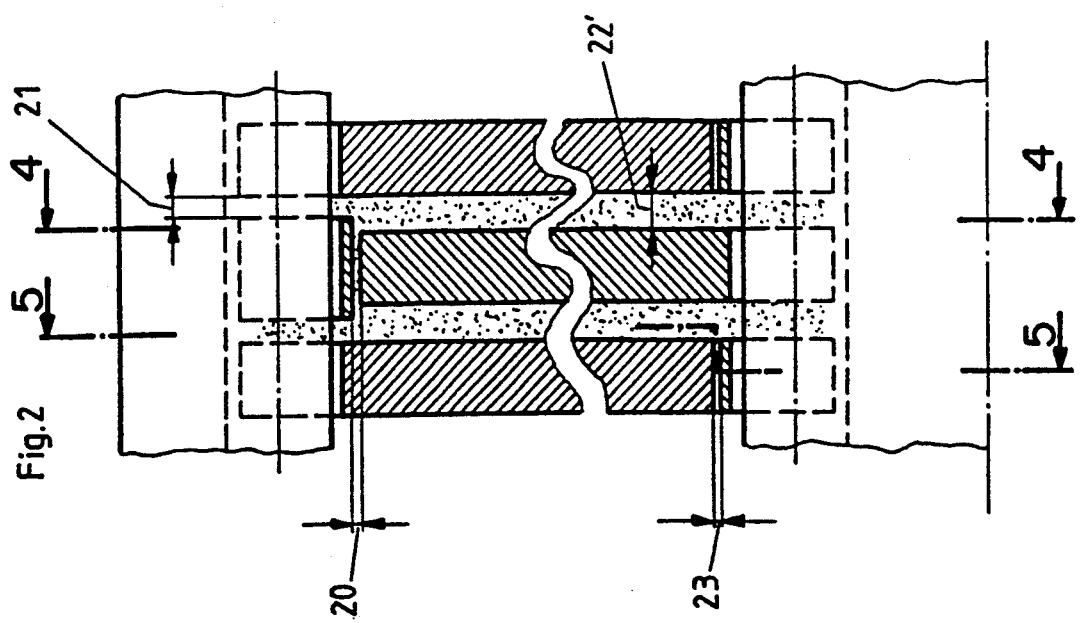
FIG. 2 is an enlarged representation of several disks of FIG. 1 at maximum gap width.

In addition, an axial sealing interval 21 (see FIG. 2) is formed between the outer choke elements 14 and the adjoining outer disks 4, but it is of minor importance since the amount of fluid flowing between the teeth 6 and around the choke elements is negligible. However, in the position with the smallest gap width 22 as shown in FIG. 3, the axial sealing interval 21 is closed. This is the extreme position of the viscous shear coupling with maximum transmitted torque.

The manner of operation of the viscous shear coupling according to the invention is as follows: When the piston 8, starting from the position of greatest gap width 22' of FIG. 2 corresponding to the least transmissible torque, is subjected to hydraulic pressure, it forces the viscous fluid against the first outer disk 4 (FIG. 1) and presses it to the left. Because of the inner choke element 15 assigned to this first outer disk, no fluid can flow around this outer disk and therefore the piston 8 pushes the disk ahead of itself. This causes the fluid/air mixture in the next chamber to be compressed so that the next inner disk also shifts to the left to compensate for the increased pressure. Here too, a pressure compensation by fluid flow around the disks is not possible because of the choke elements 14,15.

In this manner, the same pressure and therefore the same gap width 22 will be found everywhere between the disks. The force to be overcome by the piston 8 is generated only by the compressibility of the air mixed with the viscous fluid. The additional force of the Belleville spring washers such as it occurs in the prior art is unnecessary, so that more precise and more rapid adjustment of the gap width 22 is possible. Furthermore, the choke elements 14,15 also occupy the dead spaces between the disk edges and the housing 1 or the inner part 2, so that a shorter stroke path of the piston suffices.

Since this is intended to be an adjustable viscous shear coupling without a "hump," the adjustment of the gap width can be made only up to a minimum gap width 22 (see FIG. 3) wherein the adjacent disks are not in contact, and this is ensured by the width of the outer choke elements 14.

While the invention has been described by reference to specific embodiments, this was for purposes of illustration only. Numerous alternative embodiments will be apparent to those skilled din the art and are considered to be within the spirit and the scope of the invention.

I claim:

1. An adjustable viscous shear coupling, comprising a housing containing a viscous fluid therein,
an inner part extending into said housing,
a set of outer disks non-rotatably and axially movably connected to said housing,
a set of inner disks non-rotatably and axially movably connected to said inner part, said inner disks being interleaved with said outer disks so that they are separated by a gap between adjacent inner and outer disks,
an axillary movable piston acting on said inner and outer disks to adjust the width of said gap, and
axially movable means for forming sealing intervals between said outer disks and said inner part and between said inner disks and said housing to greatly inhibit overflow of said viscous fluid from one gap to another.

2. The adjustable viscous shear coupling of claim 1 wherein said means for forming sealing intervals comprise a set of inner choke element disposed between said outer disks and said inner part, and a set of outer choke elements disposed between said inner disks and said housing.

3. The adjustable viscous shear coupling of claim 2 wherein said housing and said inner part have teeth, and wherein said inner and outer choke elements comprise inner and outer rings also having teeth, the teeth of said inner rings meshing with the teeth of said inner part and the teeth of said outer rings meshing with the teeth of said housing, said inner and outer rings being axially movable within said housing.

4. The adjustable viscous shear coupling of claim 3 wherein the axial width of one of said sets of choke elements is equal to the width of said disks plus twice a minimum gap width.

5. The adjustable shear coupling of claim 4 wherein said inner and outer choke elements have machined faces, the faces of said outer choke elements having a positive tolerance, the faces of said inner choke elements having a negative tolerance.

6. The adjustable viscous shear coupling of claim 1 wherein said housing and said inner part each have teeth, and wherein said movable piston forms an outer sealing surface with said housing and an inner sealing surface with said inner part, the radius of said outer sealing surface being equal to the average radius of said teeth on said housing, the radius of said inner sealing surface being equal to the average radius of said teeth on said inner part.

* * * * *